May 3, 1966　　　H. L. R. SMYTH ETAL　　　3,249,913
ULTRASONIC UNDERWATER SOUND GENERATOR
Filed May 8, 1963　　　　　　　　　　　　2 Sheets-Sheet 1

INVENTORS
HENRY L. R. SMYTH
DAVID M. MAKOW
STANLEY K. KEAYS
BY
PATENT AGENT

May 3, 1966    H. L. R. SMYTH ET AL    3,249,913
ULTRASONIC UNDERWATER SOUND GENERATOR
Filed May 8, 1963    2 Sheets-Sheet 2

INVENTORS
HENRY L. R. SMYTH
DAVID M. MAKOW
STANLEY K. KEAYS
BY
PATENT AGENT

United States Patent Office 3,249,913
Patented May 3, 1966

3,249,913
ULTRASONIC UNDERWATER SOUND GENERATOR
Henry L. R. Smyth, David M. Makow, and Stanley K. Keays, Ottawa, Ontario, Canada, assignors to National Research Council, Ontario, Canada, a body corporate
Filed May 8, 1963, Ser. No. 278,867
3 Claims. (Cl. 340—10)

This invention relates to an ultrasonic underwater sound generator and more particularly to a device which can be readily attached to the body of an aircraft or a ship and which will emit ultrasonic locating signals when submerged in water.

There are many occasions when it would be highly desirable to have means for locating sunken objects such as submerged ships or aircraft that have crashed at sea and have gone to the bottom. In addition, it would be valuable to have a method of locating heavy mechanical equipment that is placed on the sea or lake bed. Examples of such equipment are oil and gas pipelines, headers, and other components.

It is an object of the present invention to provide an ultrasonic underwater sound generator that will automatically and for relatively long periods give an indication of the location of submerged ships, aircraft, helicopters, or other craft and apparatus thus greatly aiding search operations.

It is another object of this invention to provide an underwater sound generator that is inoperative when not immersed in water but is automatically put into operation when submerged.

It is another object of this invention to provide an ultrasonic underwater sound generator that is rugged and reliable.

These and other objects of the invention are achieved by providing an ultrasonic underwater sound generator comprising a casing having at least one opening for the entrance of water, a transistorized oscillator circuit with self contained power supply rigidly mounted in a water tight container, said container positioned internally of said casing by means of shock absorbing mounts, a cylindrical ultrasonic transducer encircling said container and mounted by means of shock absorber mounts such that the transducer is free to generate ultrasonic signals on excitation, connections from said oscillator circuit to said transducer and switch means connected to said oscillator circuit such that when the sound generator is in air the oscillator is inoperative and when the sound generator is submerged in water the oscillator is operative.

Figure 1:
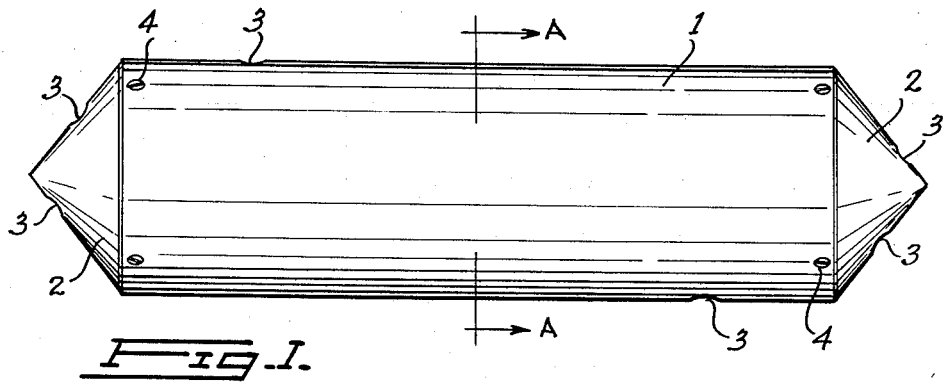
Figure 2:
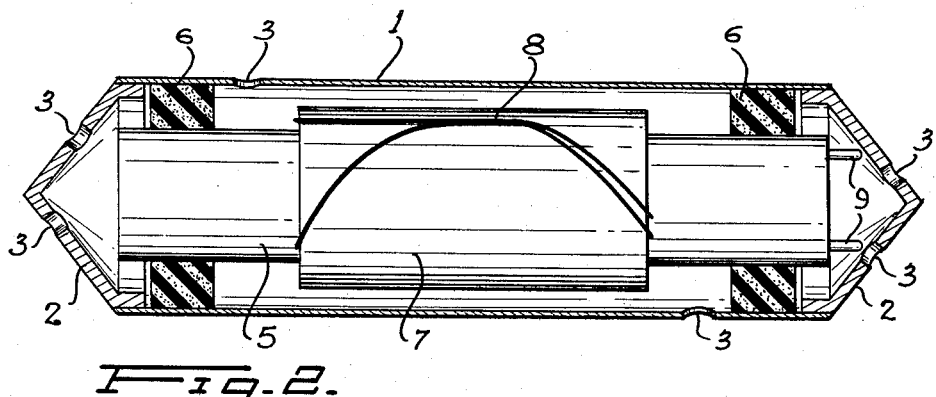
Figure 3:
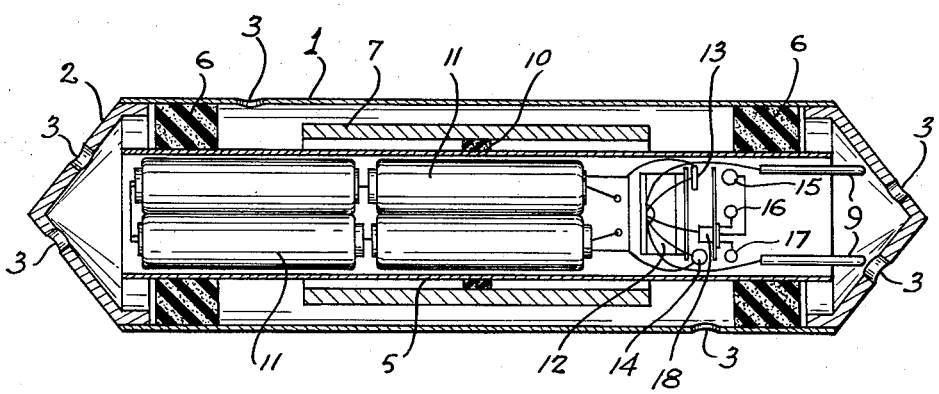
Figure 4:
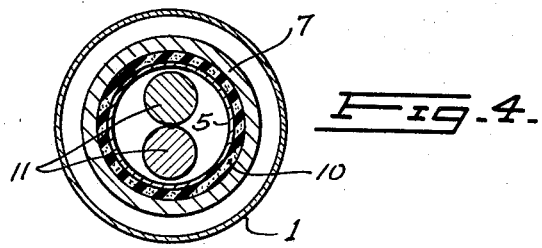
Figure 5:
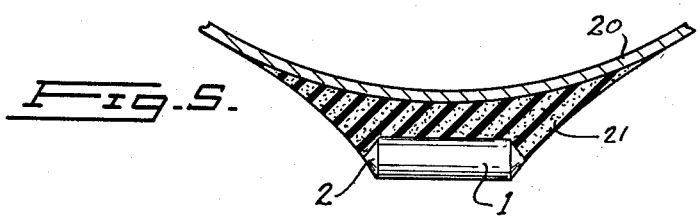
Figure 6:
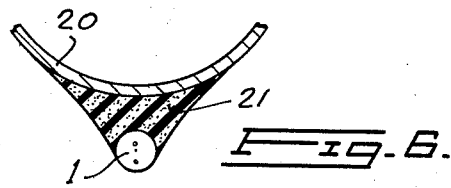
Figure 7:
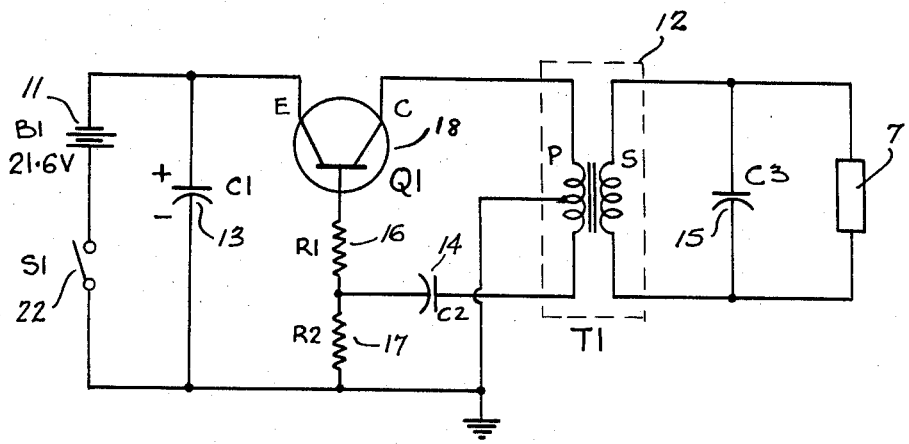

In drawings which illustrate embodiments of the invention:

FIGURE 1 is an external view,
FIGURE 2 is an internal view showing the mounting of internal components,
FIGURE 3 is a longitudinal cross-section,
FIGURE 4 is a transverse cross-section taken along line A—A of FIGURE 1,
FIGURES 5 and 6 show a method of mounting the device on the external surface of an aircraft or ship, and
FIGURE 7 is a circuit diagram of the oscillator.

Referring to FIGURES 1, 2, and 3, an ultrasonic underwater sound generator is shown comprising an external casing 1 having end caps 2 held in position by screws 4. Casing 1 and end caps 2 would be preferably made of aluminum although other materials might be used. Holes 3 have been cut in end caps 2 and casing 1 for the ready entrance of water when the complete device is submerged in water. A water tight container 5 preferably made of plastic tubing is positioned internally of casing 1 by means of shock absorbent rings 6 preferably made of sponge rubber. A cylindrical ultrasonic transducer 7 is positioned concentrically with the container 5 and casing 1 and is held in position by means of shock absorbent ring 10 also of sponge rubber. This ring contacts the transducer 7 at a central position only so that the transducer is free to radiate ultrasonic waves when excited. The transducer used is commercially available and is a barium titanite type manufactured and sold by Titania Electric Corporation, Gananoque, Ontario, Canada.

Referring now especially to FIGURE 3, an oscillator circuit made up of transformer 12, resistors 16 and 17, capacitors 13, 14, and 15, and transistor 18 and four mercury cells 11 are rigidly mounted in container 5 preferably by potting with Hysol (trade mark) potting compound. Two metal (preferably copper) posts 9 extend through the wall of container 5 into the space between the container and the outer casing. These posts are connected into the power supply lines of the electric circuit and act as a switch. When the device is submerged, water enters the outer casing through holes 3 and effectively bridges across the two posts. Sufficient current can flow through the water to allow operation of the oscillator circuit. The output of the oscillator circuit is connected via leads 8 to transducer 7.

FIGURE 4 is a cross-section of the device as shown in FIGURE 1 and shows the relative position of casing 1, transducer 7, rubber ring 10, container 5, and mercury cells 11.

FIGURES 5 and 6 show a method of mounting the underwater sound generator on the external surface 20 of an aircraft. The sound generator shown as 1 is mounted in stream-line fashion by rubber fairing 21 moulded to the contour of the aircraft and the indicator.

FIGURE 7 shows the blocking oscillator circuit which comprises transistor Q1 shown as 18, transformer T1 shown as 12, resistors 16 and 17, and capacitors 13, 14, and 15. Power for the circuit is supplied from mercury cells 11. The output of the circuit is connected to transducer 7. A switch S1 shown on this figure as 22 is placed in the power supply line. This switch shown here schematically is actually formed by metal posts 9 of FIGURES 2 and 3.

The oscillator circuit operates as a squegging oscillator and generates a series of pulses about 2 milliseconds wide and spaced by 600 milliseconds at the ultrasonic carrier frequency of 29 kilocycles. Other suitable frequencies and pulse widths could of course be used. Typical types and values for the components in the oscillator circuit are:

Transistor Q1 _____ 2N1039 (Texas Instruments).
Transformer T1 ____ Ferroxcube Potcore No. 3B2–81A, primary 12 turns, secondary 24 turns.
Resistor R1 _____ 68 ohms, ½ watt.
Resistor R2 _____ 220 K., ½ watt.
Capacitor C1 _____ 135 microfarad, 25 v., tantalum.
Capacitor C2 _____ 45 microfarad, 25 v., tantalum.
Capacitor C3 _____ .05 microfarad, 400 v., paper.
Mercury cells _____ Four type TR134R in series 21.6 v.

When the sound generator is submerged, for example when attached to the exterior of an aircraft resting on the bottom, switch S1 due to the electrical bridging action of the water energizes the oscillator circuit. The circuit excites the transducer which radiates ultrasonic locating signals at a preselected search and rescue frequency. Search ships or aircraft which would be equipped with ultrasonic detecting apparatus operating at the same frequency would detect these signals and be able to home on them.

We claim:
1. An ultrasonic underwater sound generator comprising:
   (a) a casing having at least one opening for the entrance of water,
   (b) a water tight container shock mounted in said casing to define an annular space between said container and the inner surface of said casing,
   (c) a cylindrical ultrasonic transducer encircling said container and mounted in said annular space by shock absorbent means such that the transducer is free to generate ultrasonic signals when immersed and excited,
   (d) a transistorized oscillator circuit with self-contained power supply rigidly mounted in said container,
   (e) connections from the output of the said oscillator circuit to the said transducer,
   (f) switch means connected to said oscillator circuit such that when the sound generator is in air the oscillator is inoperative and when the sound generator is submerged in water the oscillator is operative.

2. An ultrasonic underwater sound generator as in claim 1 wherein the said switch means is formed by two metallic posts electrically connected to the oscillator circuit and protruding through the wall of said container into the space between said container and said casing such that when the posts are submerged in water sufficient current can flow between the posts to effectively close the said switch.

3. An ultrasonic underwater sound generator as in claim 1 wherein the said transducer is made of barium titanite.

References Cited by the Examiner
UNITED STATES PATENTS

| | | | |
|---|---|---|---|
| 336,773 | 2/1886 | Weil | 200—152 X |
| 2,761,118 | 8/1956 | Wallace | 340—11 |
| 2,783,449 | 2/1959 | Loofbourrow. | |

CHESTER L. JUSTUS, *Primary Examiner.*

J. P. MORRIS, *Assistant Examiner.*